US007875853B2

(12) United States Patent
Edwards

(10) Patent No.: US 7,875,853 B2
(45) Date of Patent: Jan. 25, 2011

(54) LOW-COST PIR SCANNING MECHANISM

(75) Inventor: Lewin A. Edwards, Forest Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 819 days.

(21) Appl. No.: 11/781,669

(22) Filed: Jul. 23, 2007

(65) Prior Publication Data

US 2009/0027574 A1 Jan. 29, 2009

(51) Int. Cl.
*G01J 5/08* (2006.01)

(52) U.S. Cl. .................................................. 250/338.1

(58) Field of Classification Search ............... 250/338.1
See application file for complete search history.

(56) References Cited

U.S. PATENT DOCUMENTS 5,774,261 A * 6/1998 Omori et al. ................ 359/464
6,239,437 B1 * 5/2001 Barone ....................... 250/353
6,881,957 B2 4/2005 Dougherty et al.
7,005,990 B1 * 2/2006 Rocci ...................... 340/573.1
7,145,455 B2 12/2006 Eskildsen et al.
2006/0038680 A1 * 2/2006 Eskildsen et al. ........... 340/567

* cited by examiner

*Primary Examiner*—David P Porta
*Assistant Examiner*—Shun Lee
(74) *Attorney, Agent, or Firm*—Husch Blackwell Welsh Katz

(57) ABSTRACT

A passive infrared sensor (PIR) for detecting infrared radiation which includes a lens positioned in a sensor housing, and a pyroelectric element electrically connected to a circuit board within a filter housing positioned in the sensor housing. A microprocessor is electrically connected to a main circuit board and controls a liquid crystal display (LCD) attached to the sensor housing. The lens overlaps the LCD. The LCD has LCD regions corresponding to lens regions of the lens. Using the microprocessor, the LCD regions selectively prevent radiation energy from passing to the pyroelectric element, and the LCD regions selectively allow radiation energy to pass to the pyroelectric element. A signaling device communicates an alarm signal indicating when radiation energy within a specified wavelength band reaches the pyroelectric element.

14 Claims, 2 Drawing Sheets

LOW-COST PIR SCANNING MECHANISM

FIELD OF THE INVENTION

The present invention relates to a passive infrared sensor (PIR) or device for detecting infrared radiation, and more specifically, a PIR sensor which includes a lens overlapping an LCD positioned in a housing for selectively preventing and allowing radiation energy to reach a pyroelectric sensor.

BACKGROUND OF THE INVENTION

Currently, pyroelectric sensors are used in intrusion detection devices to identify intruders. Pyroelectric elements are sensitive to infrared light at wavelengths emitted by the human body, i.e., a wavelength band of about 7 to 25 μm. However, pyroelectric elements are also sensitive to broadband radiation which includes ultraviolet, infrared, and visible light. Much of this radiation is outside the wavelength band emitted by humans. To minimize false alarms, a typical pyroelectric sensing device, used in intrusion detection contains a window (or filter) which filters, i.e., minimizes the transmission of wavelengths, for example, below 5 μm. More specifically, the window is typically formed using a substrate which may be comprised of silicon. Silicon absorbs radiation energy below 1.1 μm and passes radiation energy above 1.1 μm. Filtering of the wavelengths from 1.1 to 5.0 μm is achieved by placing layers of other materials on the silicon substrate. The material in these layers must pass the wavelengths of interest (7.0 to 25.0 μm), while filtering the wavelengths from 1.1 to 5.0 μm. Each material by itself can either absorb or reflect some of the wavelengths not passed.

More specifically, known pyroelectric sensing devices may include a printed circuit board including one or more pyroelectric elements. The pyroelectric elements are electrically connected to a microprocessor. If an electrical signal from the pyroelectric elements satisfies preset conditions, the microprocessor will transmit an alarm signal to an alarm system or monitoring device. The window/filter is formed using a substrate including a plurality of coating layers. The coating layers transmit, reflect, absorb, or cause destructive interference of radiation being focused at the window from a radiation source. A secondary filter may be placed in front of the window such that window is a primary filter working in conjunction with the secondary filter to selectively reflect and pass radiation energy.

Knows pyroelectric sensing devices are inherently susceptible to detecting stimuli not associated with intrusion which results in false alarms and/or false detections. Specifically, pyroelectric sensing devices are susceptible to the radiation energy produced by automobile head lights and other light sources emanating from outside the region being protected, but penetrating into the field-of-view of the pyroelectric device, and ultimately onto the pyroelectric device package. The energy produced by automobile head lamps can be sufficient to cause an alarm in a pyroelectric sensing device. False alarms in intrusion systems are a significant distraction and loss of man hours for the police force, and also can be costly in fines to the owners of the security systems.

Additionally, known intrusion detection systems include passive infrared sensors which detect intruders moving within a field of view by measuring the temperature gradient caused by an intruder. Also, known systems include devices for monitoring a volume of space encompassing a field of view, as disclosed in U.S. Pat. No. 7,145,455, issued to Eskildsen et al. The devices may include a micro electro-mechanical system having mirrors arranged in an array for reflecting IR energy to an IR energy detector which is then converted to an output signal and monitored for determining when an intrusion has occurred. Further, the mirrors are angularly adjusted to detect or cover a desired field of view.

A drawback of these known devices includes the necessity of moving the device or detection system to achieve IR detection in a desired field of view. Further, micro electro-mechanical systems and mirror arrays are expensive to manufacture, as well as, difficult and expensive to maintain and repair.

Additionally, current PIR devices may be built with one or more fixed fields of view designed into the lens array. In the case of multiple fields of view, there is no distinguishing between these different fields of view since each view may cause a non-unique alarm when a sensor detects radiation. Thus, there is no indication of the direction from which the sensed radiation came from or ability to ignore signals from a particular direction.

Additionally, current approaches to solving for false alarms also include augmenting the blocking ability of the pyroelectric detectors window/filter to block unwanted radiation energy. Typically, this includes adding materials, sometimes pigmenting agents (e.g. Zinc Sulfide) to the lens to make the lens more opaque to white light or visible light (energy radiation at wavelengths which the human eye can see) while passing IR (infrared) energy/radiation, or may include addition of a secondary filter. Typically, the amount of a white light absorbing substance added to a passive infrared (PIR) intrusion detector lens to ensure ignoring car headlights is significant, and has an adverse effect on lens transmission in the infrared realm, which may impair the ability of the pyroelectric sensor to detect an intruder. Lens transmission may be reduced by at least 30% in the IR wavelength band between 5 and 25 μm when adequate amounts of pigmentation are added.

Another approach to solving the problem of false alarms is adding a secondary filter to an intrusion detector to ensure that the pyroelectric sensing device ignores car headlights. Secondary filters add significantly to the cost of the intrusion detector and may reduce the IR transmission by approximately 20%. Thus, when intrusion detectors incorporate secondary filters to ensure the pyroelectric sensing device ignores car headlights, the detector may not detect an intruder because the secondary filter reduces the amount of energy that will reach the pyroelectric elements. Further, secondary filters also alter the optical path between each lens element and the pyroelectric elements, which may distort the intended protection.

Additionally, energy between 0.4 and 1.8 μm reaching the pyroelectric detector, for example from an automobile headlamp, is significant and may result in a pyroelectric detector signal sufficient to cause a motion sensor to send an alarm. Specifically, the typical pyroelectric filter does not transmit energy in this wavelength band because the energy is absorbed by silicon and coating layers. However, as the filter absorbs this energy, the energy is converted into heat. This heat is re-radiated at a longer wavelength, passes through the filter and is detected by the pyroelectric element(s). Typical pyroelectric filters used today may contain layers which cause destructive interference in the 1.8 to 5.0 μm wavelength band.

Another drawback to current pyroelectric sensing devices is the susceptibility of the window/filter to absorb energy in close proximity to the sensing elements (ie, the housing and most significantly the optical filter). Although the pyroelectric window/filter blocks energy below 5 μm, a large portion of this blocking comes in the form of energy absorption and a smaller portion from destructive interference and reflection.

The absorbed energy is converted into heat, which is re-radiated at wavelengths that pass through the filter to the sensitive pyroelectric elements, thereby generating an electrical response leading to a false alarm from detection of the energy source.

It would therefore be desirable to provide a PIR device and method for intrusion detection which achieves IR detection in a desired field of view without the necessity of moving the device or detection system, or the necessity to reflect or redirect IR radiation to a pyroelectric sensor. It would also desirable to provide a PIR device and method that can prevent unwanted energy from reaching the pyroelectric sensors without producing heat and the undesirable re-radiation of energy. Thus, the desired PIR device would substantially eliminate false alarms/detections without the shortcomings of current devices and methods. It would further be desirable to provide a pyroelectric sensor which prevents visible and near infrared radiation (NIR) energy from reaching the pyroelectric filter. Also, it would be desirable to simplify manufacturing, reduce costs, and improve reliability of current PIR devices.

SUMMARY OF THE INVENTION

In an aspect of the invention a passive infrared sensor comprises a sensor housing including a first circuit board and a filter housing including a second circuit board. The filter housing is positioned within the sensor housing. A filter is positioned in the filter housing and the filter is transparent to a first specified wavelength band of radiation. The filter blocks a second specified wavelength band of radiation outside the first specified wavelength band of radiation. A liquid crystal display (LCD) is attached to the sensor housing. At least one pyroelectric element is electrically connected to the second circuit board. A microprocessor is electrically connected to the first circuit board. At least one lens is attached to the housing and overlapping the LCD. The lens has at least one lens region corresponding to at least one LCD region. The at least one LCD region is controlled by the microprocessor to selectively prevent radiation energy from passing to the pyroelectric element and to selectively allow the radiation energy to pass to the pyroelectric element. The microprocessor receives an electrical signal generated from the at least one pyroelectric sensor and initiates an alarm signal when radiation within the specified wavelength band reaches the at least one pyroelectric sensor.

In a related aspect, the lens is a Fresnel lens.

In a related aspect, the lens is a Fresnel lens and the LCD regions angularly correspond to a lenslet of the Fresnel lens.

In a related aspect, the Fresnel lens and LCD are combined, and a front protective layer of the LCD is directly scribed with at least one Fresnel lens pattern.

In a related aspect, the Fresnel lens and LCD are combined such that a front polarizer of the LCD is directly scribed with at least one Fresnel lens pattern.

In a related aspect, the Fresnel lens and the LCD are concave.

In a related aspect, the lens overlapping the LCD is in spaced relation with the LCD to define a gap therebetween.

In a related aspect, the gap has a substantially constant width dimension between the LCD and the lens.

In a related aspect, the at least one sensor includes a plurality of sensors.

In a related aspect, the LCD is coupled to the lens using an adhesive.

In a related aspect, the lens and the LCD are convex.

In a related aspect, the lens and the LCD are concave.

In a related aspect, the microprocessor initiates the alarm signal when the radiation within the specified wavelength band reaches the at least one pyroelectric element from multiple lens regions.

In a related aspect, the microprocessor initiates the alarm signal when the radiation within the specified wavelength band reaches the at least one pyroelectric element from multiple lens regions in a specified sequence.

In another aspect of the invention a method for detecting infrared radiation comprises providing a sensor housing including a first circuit board and a filter housing including a second circuit board; positioning the filter housing within the sensor housing; positioning a filter in the filter housing, the filter being transparent to a first specified wavelength band of radiation and the filter blocking a second specified wavelength band of radiation outside the first specified wavelength band of radiation; attaching a liquid crystal display (LCD) to the sensor housing; electrically connecting at least one pyroelectric element to the second circuit board; electrically connecting a microprocessor to the first circuit board; attaching at least one lens to the sensor housing and overlapping the LCD; corresponding at least one lens region of the lens to at least one LCD region; controlling the at least one LCD region using the microprocessor for selectively allowing or preventing radiation energy from reaching the at least one sensor; and signaling when the radiation energy reaches the at least one pyroelectric element.

In a related aspect, controlling the LCD regions includes allowing radiation energy to pass toward the at least one pyroelectric element from a specified LCD region; and preventing radiation energy from passing to the at least one pyroelectric element from another specified LCD region.

In a related aspect, the method further includes spacing the LCD and the lens to define a gap therebetween.

In a related aspect, the lens is a Fresnel lens and further including angularly corresponding the LCD regions to corresponding lenslets of the Fresnel lens.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
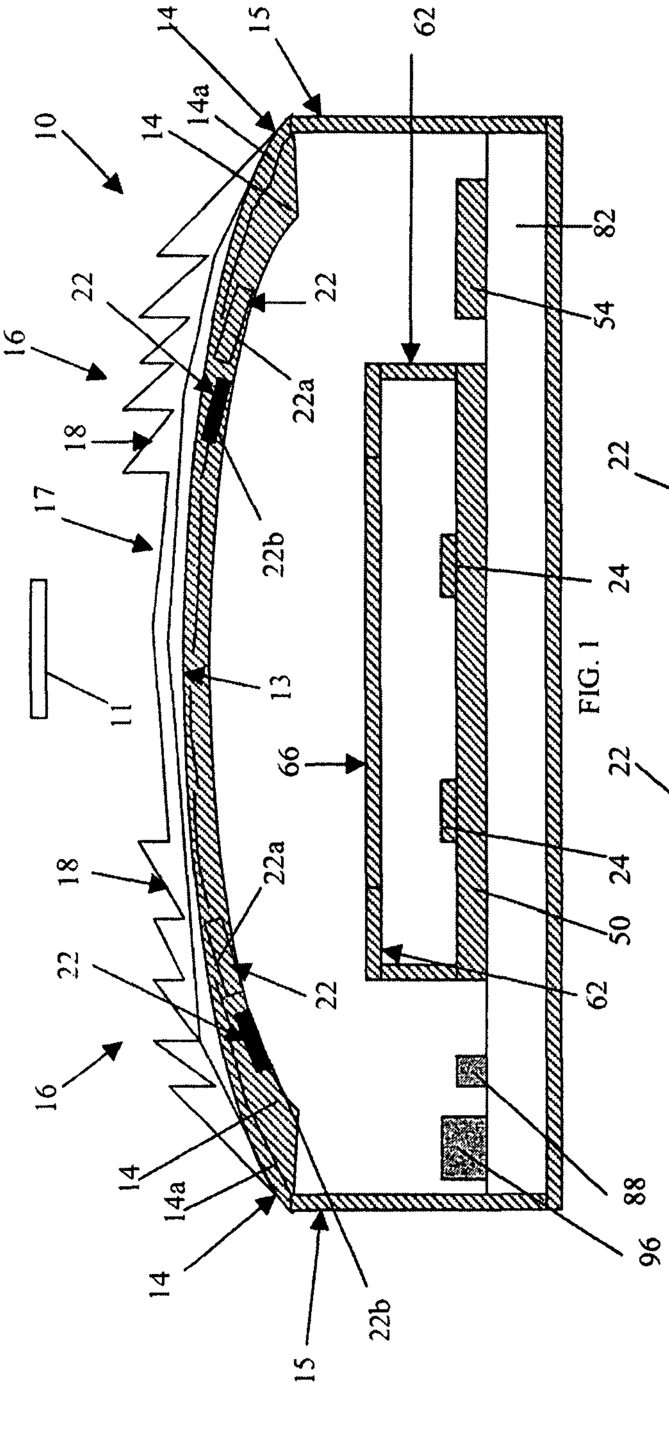
FIG. 1 is a side elevational cross-sectional view of a pyroelectric sensor according to an embodiment of the invention depicting a lens, an LCD, pyroelectric elements mounted on a circuit board and a microprocessor mounted on a main circuit board.
Figure 2:
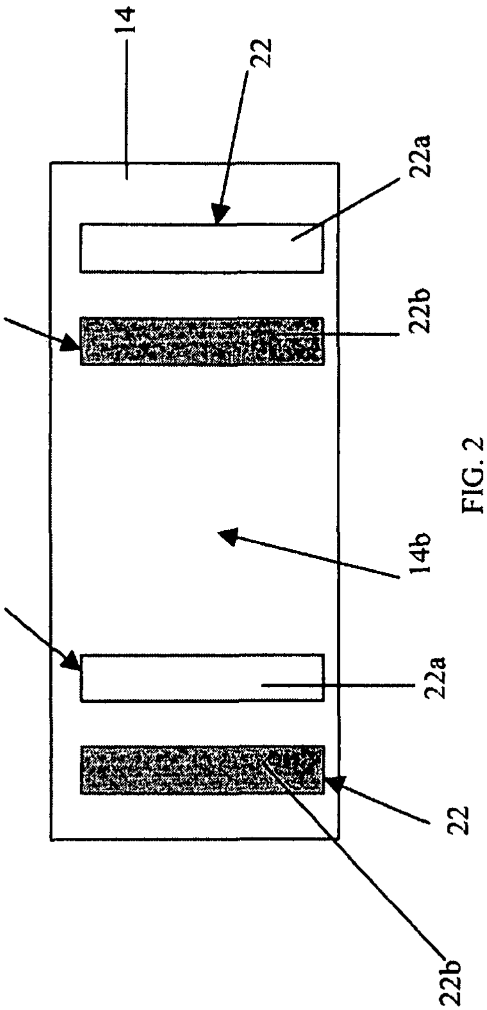
FIG. 2 is rear elevational view of the LCD shown in FIG. 1 depicting LCD regions as clear and opaque.

An exemplary embodiment of a passive infrared (PIR) sensor 10 according to the present invention is shown in FIGS. 1 and 2. A lens embodied as a Fresnel lens 16 having lenslets 18 and is arcuately shaped and attached to a sensor housing 15. An LCD 14 includes a rear surface 14*b* and the LCD is flexible in the embodiment shown in FIG. 1, but in other embodiments may be flat as well as rigid and mating with a similarly shaped lens. The LCD 14 includes a front protective layer embodied as a front polarizer 14*a* (shown in FIGS. 1 and 4) for polarizing plane incident light in an arbitrary direction. The polarizer passes only those lightwaves whose associated electromagnetic fields are oriented in a predetermined "polarizing direction." The polarizing direction lies in a plane parallel to the surface of the polarizer.

Figure 4:
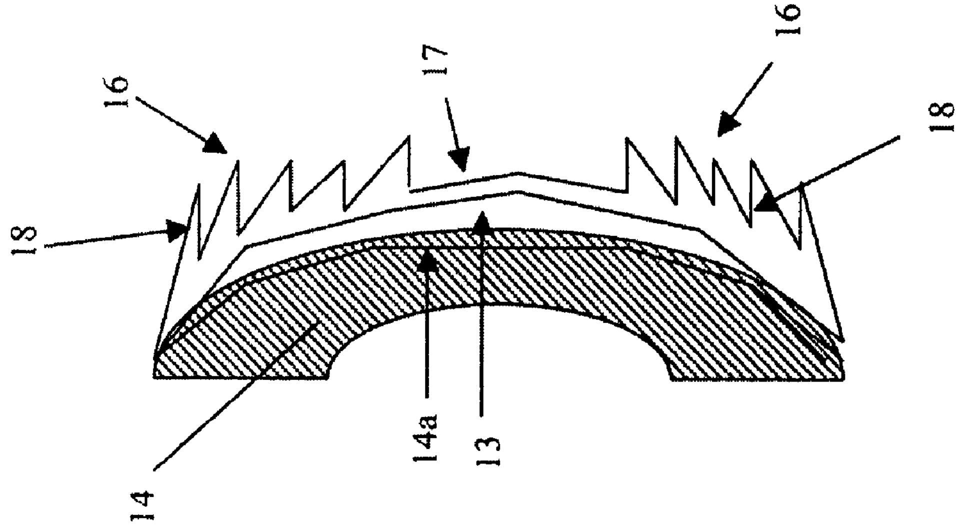
FIG. 4 is a cross sectional view along line A-A in FIG. 3 depicting the lens and the lenslets shown in FIG. 3.

The Fresnel lens 16 overlaps the LCD 14, and a source of radiation energy, represented by element 11, is positioned in front of the lens 16. The Fresnel lens 16 is typically arcuately shaped as shown in FIGS. 1 and 4, and the LCD 14 is also arcuately shaped to fit in mating relation with the Fresnel lens 16. The Fresnel lens 16 and the LCD 14 are in space relation to each other and thereby define a space or gap 13 therebetween. The space 13 remains constant between the lens 16 and the LCD 14. One advantage of the flexible LCD 14 is that it conforms to the curved surface of the lens 16. The LCD includes LCD regions 22 positioned behind the lenslets 18, such that each LCD region 22 of the LCD 14 is behind a corresponding lenslet 18 of the Fresnel lens 16.

Further referring to FIG. 1, a filter housing 62 includes a filter or window 66 for selectively allowing or preventing specified wavelengths of radiation energy access to the pyroelectric elements 24. It is understood that a particular or a range of wavelengths of radiation energy may be prevented from reaching the elements 24 by way of filtering methods using the window 66 known in the art.

In an alternative embodiment, the Fresnel lens 16 and LCD 14 are combined into a single subassembly for reducing manufacturing costs. In such an embodiment, the front polarizer 14*a* or a protective layer over a polarizer attached to the front of the LCD 14 is directly scribed with Fresnel lens pattern(s).

In another alternative embodiment, the filter 66 may be omitted and individual filters (which may have differing characteristics) may be affixed to, or printed upon, the rear surface 14*b* of the LCD 14. In this embodiment, the device can effectively measure different spectral bands of the radiation source 11, and perform additional processing to identify specific alarm conditions or reject specific false alarm conditions based on the spectral characteristics of the source.

The Fresnel lens 16 is shown in an exaggerated form in FIGS. 1 and 4 to more easily depict the lenslets 18. The Fresnel lens 16 may be molded using a piece of flat plastic, which is then bent or curved so that all the radiation through the lens is directed toward the pyroelectric element or sensor 24 beneath the lens 16. The lenslets 18 are lens regions of the Fresnel lens 16. Each lenslet 18 includes a different lens thickness and refraction index. The radiation energy source 11 may include, for example, infrared energy emitted by a person, and other sources of radiation energy such as car headlights. Instead of one section of the lens directly in front of the pyroelectric element, the curved Fresnel lens 16 can direct a multiplicity of angles of light through the lenslets 18 to the pyroelectric elements 24. Pyroelectric elements 24, only two of which are shown for illustrative purposes, are mounted to a printed circuit board (PCB) 50 mounted in the filter housing 62. The lens 16 selects the angles of light by selecting which LCD region 22 to make clear 22*a* and thus allow light to pass therethrough. Thus, the lens 16 is able to receive radiation from a select angle without physically moving the lens as would be necessitated by a flat lens with a single section passing radiation to the pyroelectric elements 24.

In another embodiment, for example, the LCD may be flat, or may be a plurality of other geometric shapes, such as rectangular, different curvatures such as convex or concave. Correspondingly, for example, the lens would also be flat and of the same geometric shape as the LCD or vice versa. Alternatively, the lens may be, for example, convex, concave or another type of lens other than a Fresnel lens.

Figure 3:
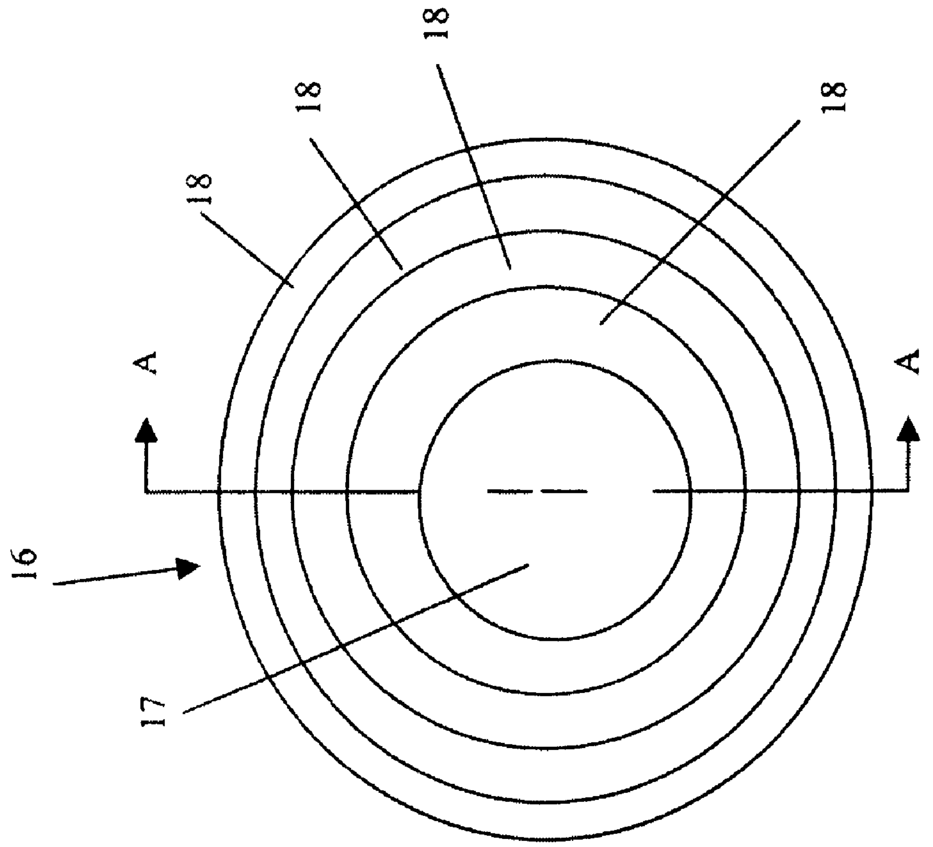
FIG. 3 is a front elevational view of a Fresnel lens depicting a plurality of lenslets.

Referring to FIGS. 1, 3 and 4, in operation, the Fresnel lens 16 includes lens regions or lenslets 18 and a center lens region 17. The lenslets 18 are shown in cross-section in FIGS. 1 and 4 and have a saw-tooth profile. As shown in FIG. 3, the Fresnel lens 16 includes a center lens region 17 with the lenslets 18 concentrically positioned around the center lens region 17. Referring to FIGS. 1 and 2, the LCD regions 22, only four of which are shown for illustrative purposes, are either opaque 22*b* or clear 22*a*. The lens 16 overlaps the LCD 14 such that the LCD regions 22 correspond to lenslets 18. The microprocessor 54 selectively controls the LCD regions 22 to be "on" or "off", i.e., opaque 22*b* or clear 22*a*, respectively. When the LCD regions are clear 22*a*, the pyroelectric element 24 can receive radiation energy through the lenslet 18 and the clear LCD region 22*a*. Thus, radiation energy from a specific direction defined by the positioning of the lenslet 18 may emanate from, e.g., a person, to a sensor 24. When radiation energy in a specified wavelength range reaches the pyroelectric elements 24 the microprocessor 54 determines whether an alarm state of "on" should be initiated to indicate that an intruder has been detected.

The microprocessor 54 on the main circuit board 82 controls which LCD region 22 is being used, i.e., allowing radiation through to the pyroelectric elements 24 by making a cleat LCD region 22*a*, or blacking out a select LCD region 22*b* to prevent any radiation from reaching the pyroelectric elements 24. For example, the device 10 can scan through the LCD regions 22 in a selection process for selecting which LCD region meets specified parameters. Thus, the device 10 can distinguish between different fields of view and assign different alarm messages to each field of view. A central station operator can effectively reprogram the protected field of view remotely by instructing the alarm panel to process certain alarm messages and ignore others.

Regarding the sensor 10 operation and referring to FIG. 1, radiation energy is allowed to pass through clear LCD regions 22*a*. When the pyroelectric window/filter 66 passes wavelengths of interest, i.e., specified wavelength bands of radiation energy, the absorption of radiation by the pyroelectric element 24 causes the elements 24 to heat up. The pyroelectric elements 24 generate an electrical signal proportional to the rate of temperature change as a result of the pyroelectric effect. The electrical signal from the pyroelectric elements travels via electrical connections in the PCB 50 in the filter housing 62, and is received by the main PCB 82. Thereafter, the electrical signal is amplified by amplifier 88 and processed by the microprocessor 54, both mounted on the main printed circuit board 82. The microprocessor 54 determines an alarm state (i.e., alarm "on" or "off") of the PIR device 10 by first determining if an alarm threshold is achieved. The alarm threshold is attained when the electrical signal strength is greater than a predetermined value. At that point, the sensor 10 using the microprocessor 54 sends an alarm signal to an alarm system 92 which may be an alarm system control panel 92. The alarm signal may be sent to the alarm system 92 using wired or wireless technology which may utilize a radio transmission. This is achieved by the microprocessor 54 removing power from a relay 96 on the main PCB 82 which opens the relay or alarm circuit. The open circuit is interpreted by the alarm system 92 as an alarm "on" state. An alarm can be generated from the alarm system 92, as well as, transmitted to a remote receiving device, a monitoring station, and to alert emergency personnel using, for example, wired or wireless technology.

Thus, the sensor 10 can discern the spatial location of the incoming radiation using the LCD regions, and can allow or prevent radiation from a specified angle from entering the device without physically moving the device. Furthermore, the device can thereby prevent false alarms by, for example, preventing radiation energy from a known location from entering the sensor 10 by making opaque LCD regions 22*b* which face appliances, heater vents, or other sources of IR energy.

In another embodiment of the invention, the sensor 10 can require a specific heat motion pattern to occur before the microprocessor sends an alarm "on" signal. For example, each lenslet 18 and LCD region 22 may represent a zone and a specific heat pattern may be required from each zone before the microprocessor sends an alarm "on" signal. Further, a multi-zone method may be used where each zone has a specified angular requirement, e.g., the radiation must be received by the pyroelectric sensors from a first specified direction in a first zone, and from a second specified direction in a second zone. The specified direction may be, for example, generally up or down, or from a particular angular direction.

In another embodiment of the invention, the microprocessor initiates a scan of the LCD regions and denotes which LCD regions corresponding to spatial zones in a room or area are initiating the electrical signal from the pyroelectric sensors. Thus, the microprocessor builds a picture of where the IR sources are located in its surroundings. This information can be used either to assign specific alarm loop numbers to particular spatial zones, or to add extra false alarm immunity, e.g., by requiring an IR source to appear in one zone then move completely to another zone before the alarm signal is initiated. Further, the IR source may be required to appear in multiple zones, particular zones in a specified sequence, and/or at a particular time or within specified times before an alarm signal is initiated.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A passive infrared sensor, comprising:

a sensor housing including a first circuit board;

a filter housing including a second circuit board, the filter housing positioned within the sensor housing;

a filter positioned in the filter housing and the filter being transparent to a first specified wavelength band of radiation and the filter blocking a second specified wavelength band of radiation outside the first specified wavelength band of radiation;

a liquid crystal display (LCD) attached to the sensor housing;

at least one pyroelectric element electrically connected to the second circuit board;

a microprocessor electrically connected to the first circuit board;

at least one lens attached to the sensor housing and overlapping the LCD, the at least one lens having at least first and second lens regions corresponding to at least first and second LCD regions, the at least first and second LCD regions being individually controlled by the microprocessor to distinguish between at least first and second fields of view by selectively preventing radiation energy at a first angle from passing to the at least one pyroelectric element while selectively allowing radiation energy at a second angle to pass to the pyroelectric element; and the microprocessor receiving an electrical signal generated from the at least one pyroelectric element and initiating an alarm signal when radiation within the first specified wavelength band reaches the at least one pyroelectric sensor.

2. The sensor of claim 1, wherein the at least one lens is a Fresnel lens.

3. The sensor of claim 1, wherein the at least one lens is a Fresnel lens and at least one of the at least first and second LCD regions angularly correspond to a lenslet of the Fresnel lens.

4. The sensor of claim 3, wherein the Fresnel lens and LCD are combined, and a front protective layer of the LCD is directly scribed with at least one Fresnel lens pattern.

5. The sensor of claim 3, wherein the Fresnel lens and LCD are combined, and a front polarizer of the LCD is directly scribed with at least one Fresnel lens pattern.

6. The sensor of claim 3, wherein the Fresnel lens and the LCD are concave.

7. The sensor of claim 1, wherein the at least one lens overlapping the LCD is in spaced relation with the LCD to define a gap therebetween.

8. The sensor of claim 7, wherein the gap has a substantially constant width dimension between the LCD and the at least one lens.

9. The sensor of claim 1, wherein the at least one pyroelectric element includes a plurality of sensors.

10. The sensor of claim 1, wherein the LCD is coupled to the at least one lens using an adhesive.

11. The sensor of claim 1, wherein the at least one lens and the LCD are convex.

12. The sensor of claim 1, wherein the at least one lens and the LCD are concave.

13. The sensor of claim 1, wherein the microprocessor initiates the alarm signal when the radiation within the first specified wavelength band reaches the at least one pyroelectric element from a plurality of the at least one lens region.

14. The sensor of claim 1, wherein the microprocessor initiates the alarm signal when the radiation within the first specified wavelength band reaches the at least one pyroelectric element from a plurality of the at least one lens region in a specified sequence.

* * * * *